H. LANDSIEDEL.
ADDING MACHINE.
APPLICATION FILED MAR. 6, 1911.
1,141,348.
Patented June 1, 1915.
7 SHEETS—SHEET 2.
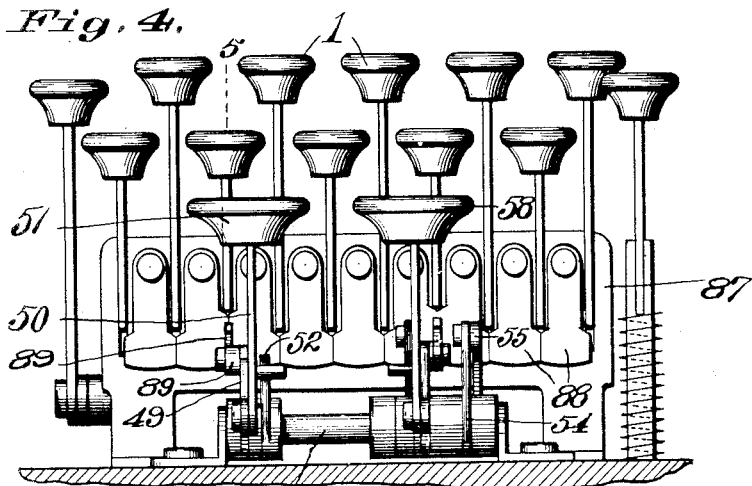
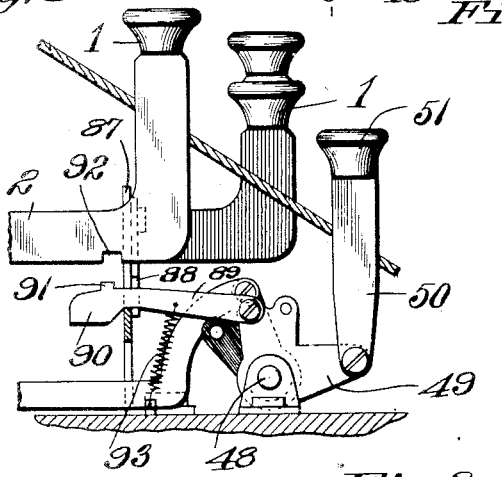
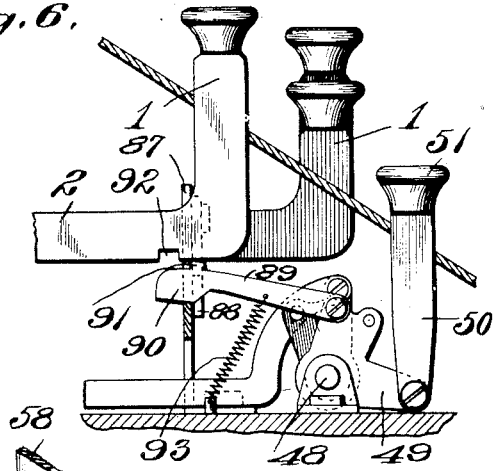
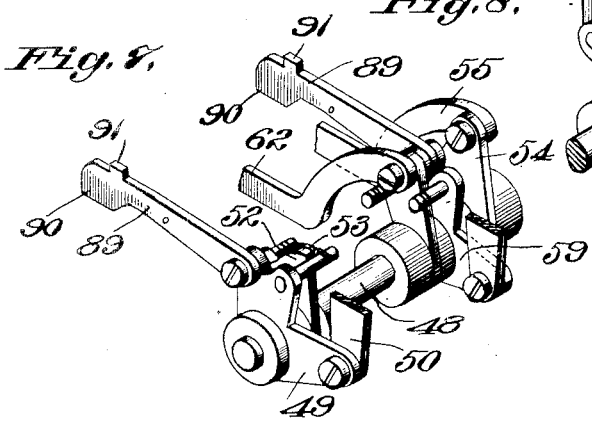
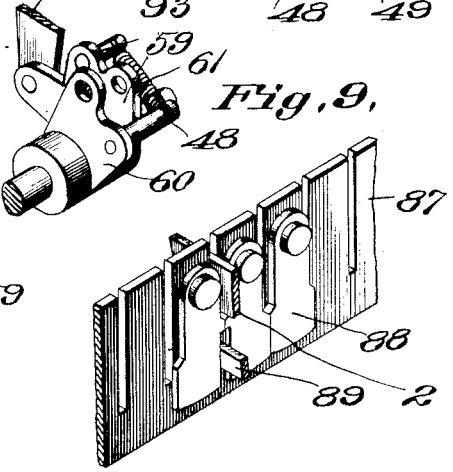
Attest:
Inventor:
Harry Landsiedel,
by J. L. Rippy
Atty

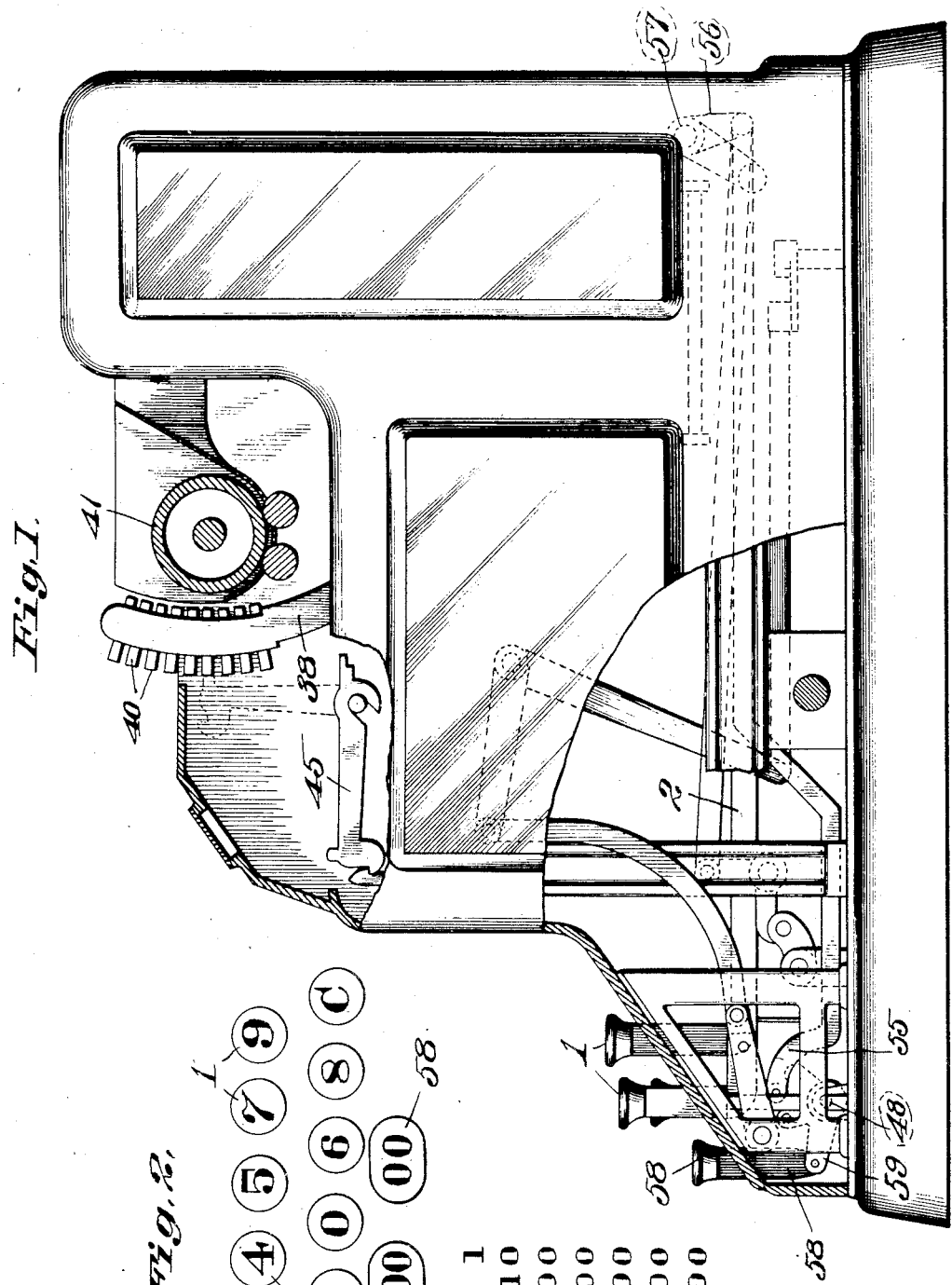

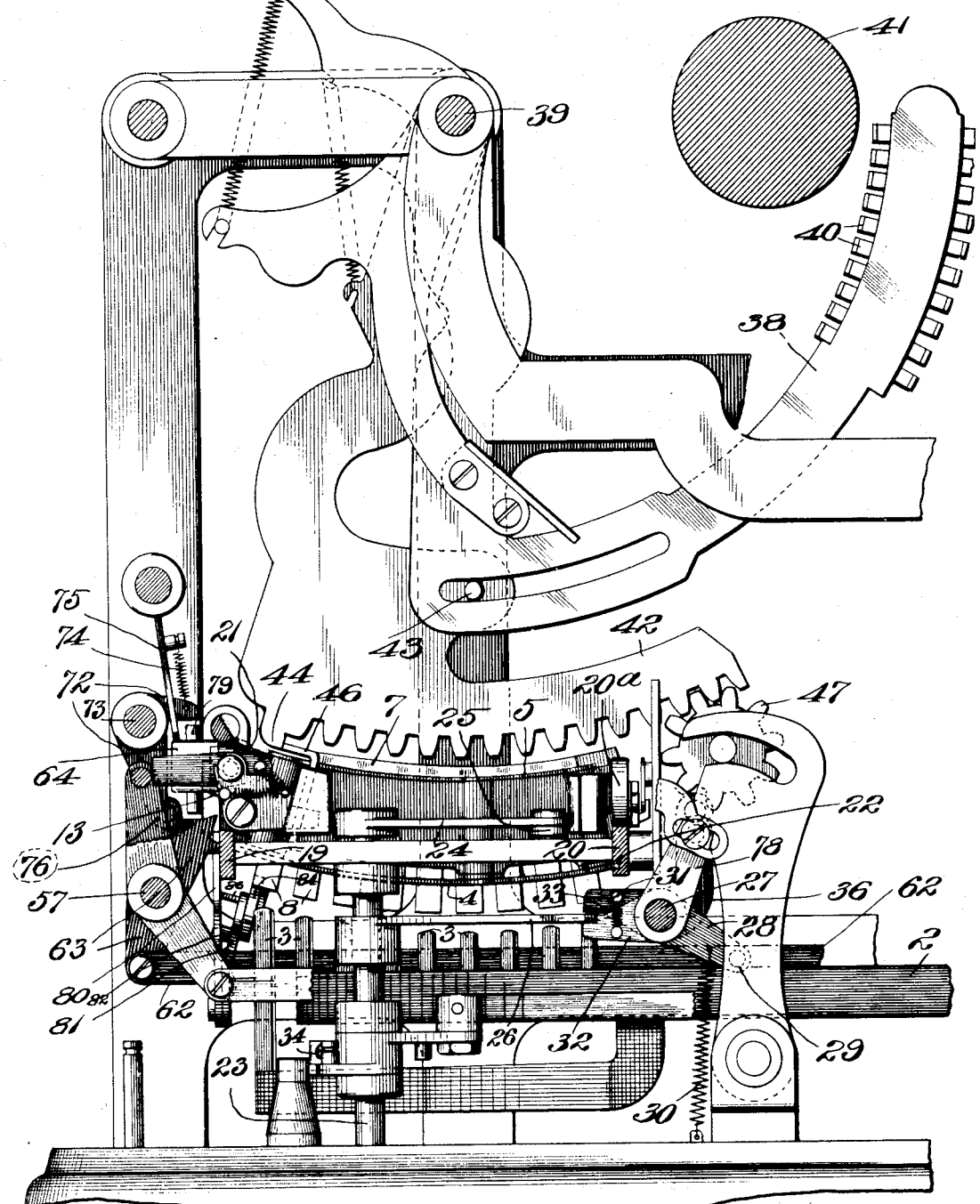

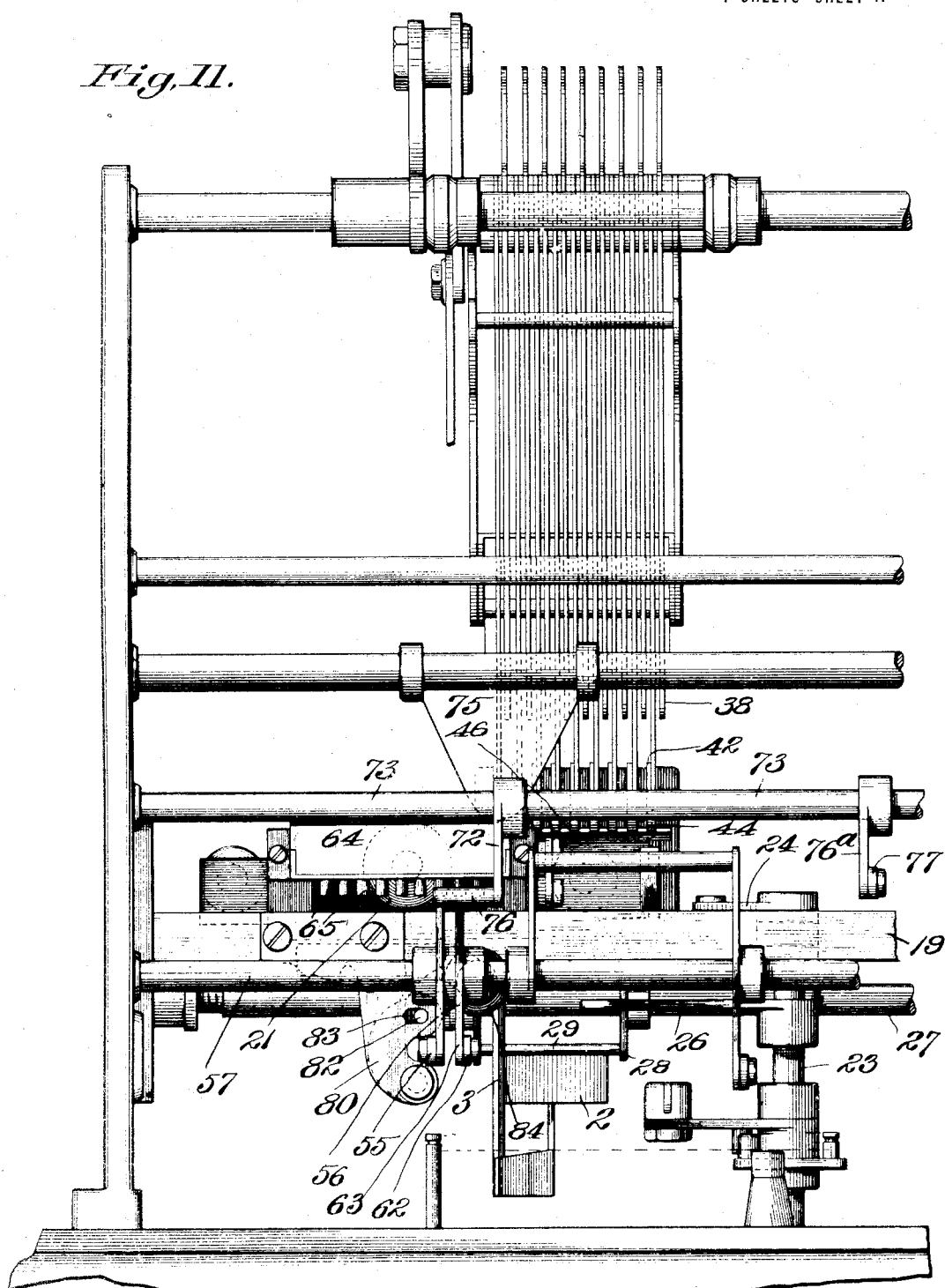

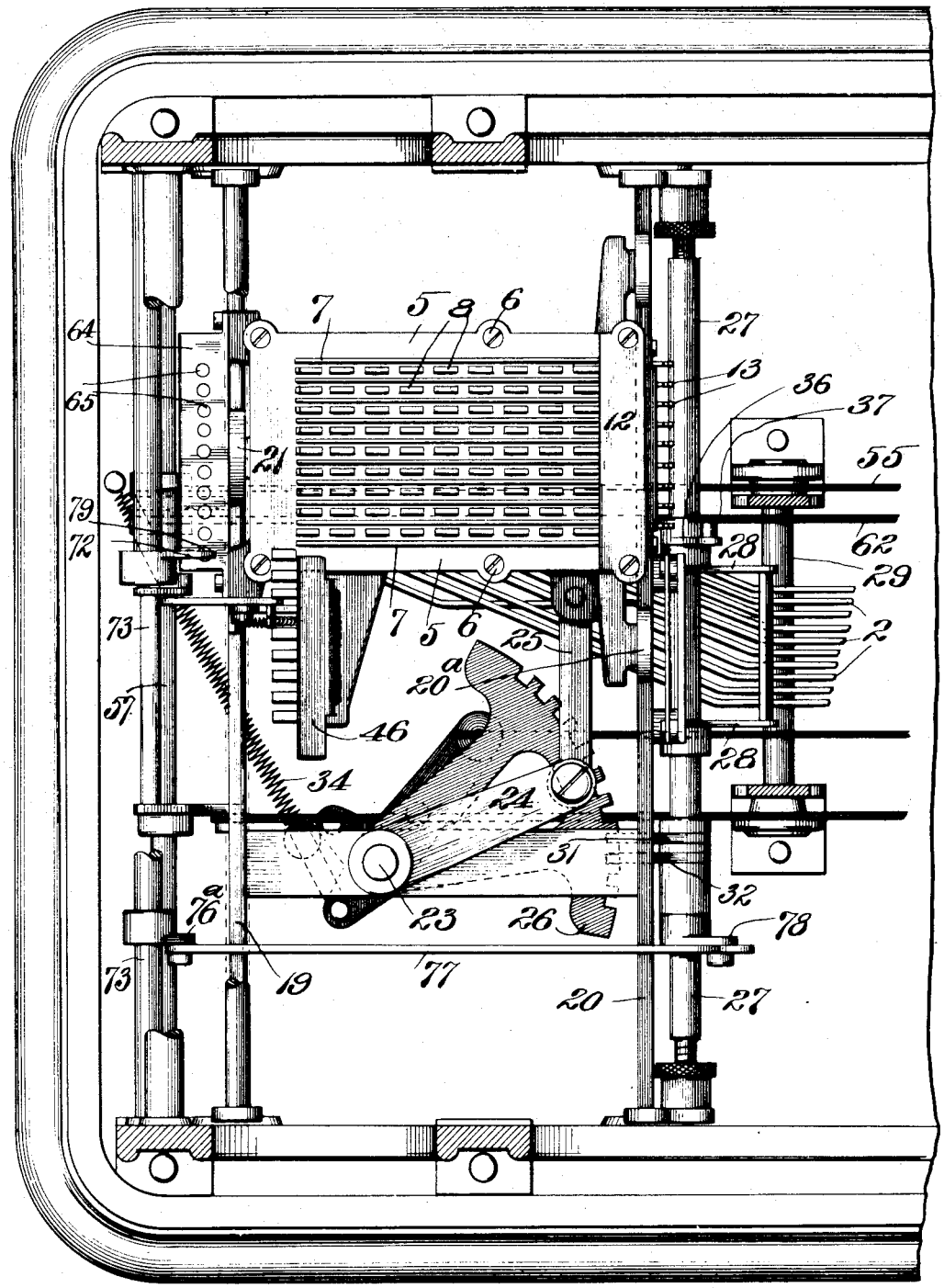

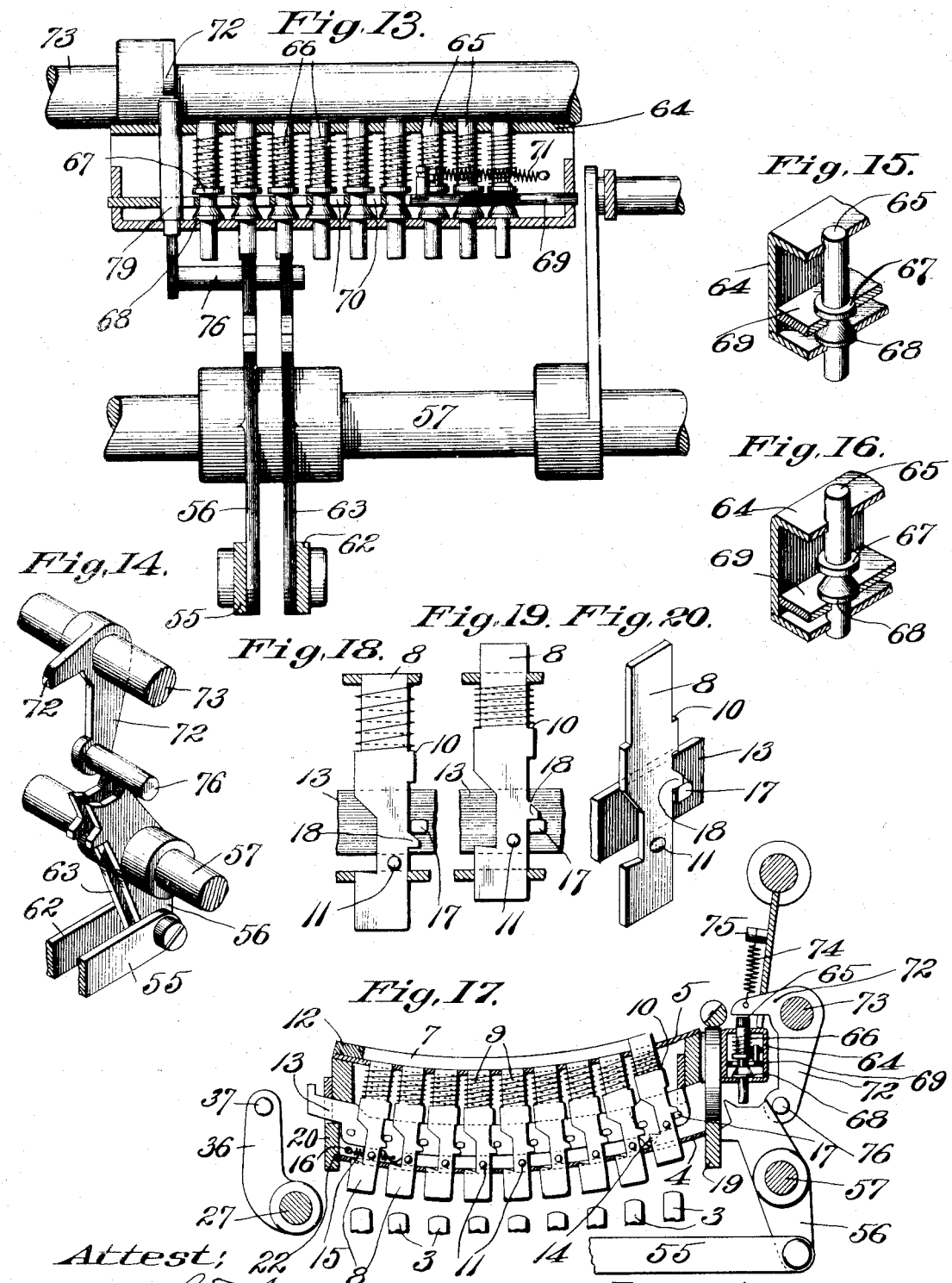

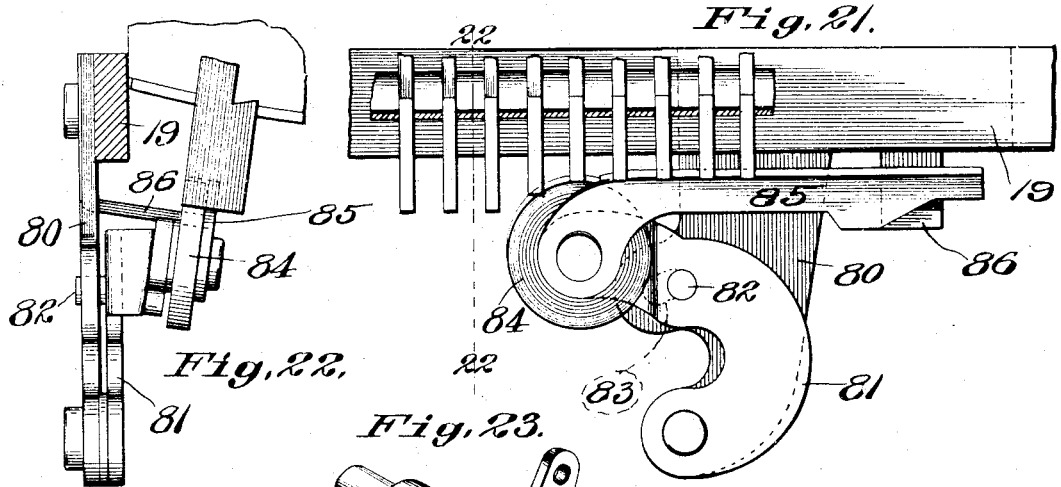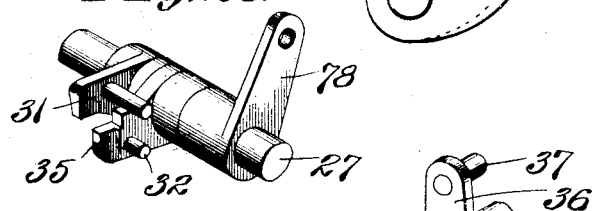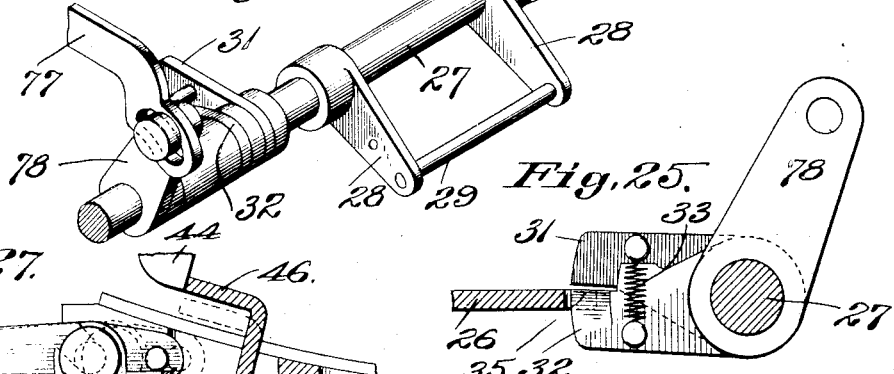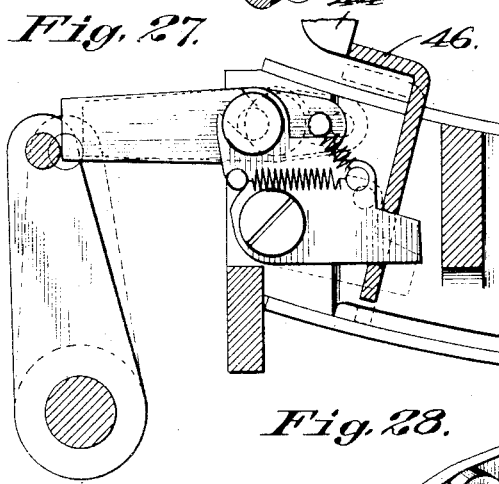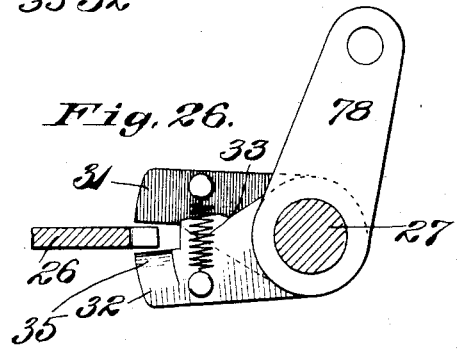

UNITED STATES PATENT OFFICE.

HARRY LANDSIEDEL, OF POPLAR BLUFF, MISSOURI, ASSIGNOR, BY MESNE ASSIGNMENTS, TO THE DALTON ADDING MACHINE COMPANY, OF CINCINNATI, OHIO, A CORPORATION OF OHIO.

ADDING-MACHINE.

1,141,348.  Specification of Letters Patent.  Patented June 1, 1915.

Application filed March 6, 1911. Serial No. 612,722.

*To all whom it may concern:*

Be it known that I, HARRY LANDSIEDEL, a citizen of the United States, residing at Poplar Bluff, Missouri, have invented a new and useful Adding-Machine, of which the following is a specification.

This invention relates to adding machines of that type which embody a movable carriage containing a series of pins and keys operable to set the pins to represent numbers.

A machine of the type above referred to is now on the market and is known commercially as the "Dalton." The adding mechanism of the adding and writing machine illustrated in British Patent No. 854 of 1904, and in application in the United States Serial No. 140,390 of January 24th, 1903, is substantially the same, in a broad sense as the "Dalton" adding machine now in commercial use.

For convenience of illustration I have shown my present invention embodied in an adding machine of the "Dalton" type, but it will be apparent that many of the features of the invention are adaptable to any machine containing a movable pin carriage, and I do not restrict myself to the use of the invention in any specific adding machine.

The adding mechanism of the machine described in the British patent above named, contains a movable pin carriage having a series of pins arranged therein, an escapement motor device for moving the carriage step by step laterally and a series of keys which are operable to set the pins in the carriage to represent numbers and to cause the escapement motor device to operate effectively to move the carriage to any desired position relative to the adding and recording mechanism. This also is the arrangement of the "Dalton" adding machine now on the market. In both of said machines the carriage is moved step by step as each digit key is struck, and there is no operation whereby said carriage may be moved more than one step as the result of a single operation of any key, so that in setting up in the carriage the number "10,000", for instance, it is necessary first to operate the "1" key and then to operate the "0" four times successively. Numbers containing two or more ciphers in adjacent orders are frequently encountered, and in introducing such numbers into the machine of the patent aforesaid, or into the Dalton machine, the operation above described is followed. My present invention is intended to facilitate the introduction of such numbers into the machine and to that end I have provided a mechanism whereby the pin carriage may be caused to move one or two or more steps at a single key operation, as desired. Said mechanism includes a novel tabulating or carriage controlling device whereby the carriage may be released and moved a predetermined distance irrespective of whatever position the carriage may occupy at the time of such operation.

Having thus briefly described the nature and purpose of my invention, I will now describe a preferred embodiment thereof, reference being made to the accompanying drawings in which—

Figure 1 is a side elevation of a Dalton adding machine having my invention embodied therein. Fig. 2 is a diagrammatical view of the key-board of a Dalton adding machine showing also a number of tabulating or multiple cipher keys arranged in convenient relation to the digit keys. Fig. 3 illustrates a specimen of work performed on the machine by use of the usual digit keys and also by use of the digit keys and the multiple cipher or tabulating keys. Fig. 4 is a front view of the key-board with the casing removed. Figs. 5–6 are sectional views taken approximately on the line 5—6 of Fig. 4, showing one of the tabulating or multiple cipher keys in idle position as in Fig. 5 and in operative or depressed position, as in Fig. 6. Fig. 7 is a perspective view of that part of the multiple cipher or tabulating mechanism which is contained in the key board. Fig. 8 is a perspective view of the portion of the said mechanism showing the elastic connection between the key lever and the tabulating mechanism controlled thereby. Fig. 9 is a perspective of the key locking device. Fig. 10 is a sectional view of the rear portion of the machine illustrating the present invention associated with the movable pin carriage. Fig. 11 is a rear elevation of the mechanism shown in Fig. 10. Fig. 12 is a plan view of the movable pin carriage and the tabulating mechanism constituting the subject matter of the present invention. Fig. 13 is a detail sectional view showing the tabulating stops on the movable pin carriage and the key controlling device for setting such stops. Fig. 14 is a perspective view of the key controlled device whereby the tabulating stops are set. Fig. 15 is a perspective view showing one of the tabulating stops in idle position in its support. Fig. 16 is a perspective view showing one of the tabulating stops after it has been moved to operative position. Fig. 17 is a sectional view of the pin carriage and the tabulating stop support, and shows also the key driven hammers whereby the pins in the carriage are set to represent numbers. Fig. 18 is an enlarged view of one of the stops in idle position. Fig. 19 is a view of said stop set to represent a digit or a number. Fig. 20 is a perspective view showing in detail the construction of the stops and the sliding bars whereby they are held in their elevated adjustments. Fig. 21 is a front side view of a device whereby the "0" pins in the pin carriage are raised to operative position whenever the carriage returns to its idle position. Fig. 22 is an inner end view of the device which raises the "0" pins. Fig. 23 is a perspective view of the escapement pawls. Fig. 24 is a perspective view of the escapement pawl shaft and the connection whereby the escapement pawls will be operated by the digit keys and also by the tabulating or multiple cipher keys. Fig. 25 is a view showing the escapement pawls and escapement wheel or segment at rest. Fig. 26 is a view showing the escapement released by operation of one of the multiple cipher or tabulating keys. Fig. 27 is a detail sectional view of the recorder stop and the device for releasing said stop in listing a total or in "clearing" the machine. Fig. 28 is a perspective view of the recorder release device.

The adding mechanism of the said Hopkins application and British patent and of the "Dalton" adding machine manufactured under said application includes a series of ten figure keys 1 arranged in convenient relation in a key-board and having levers 2 extending rearwardly in the machine and pivotally supported. The rear ends of said levers terminate in a longitudinal row and are provided with upward extensions 3 constituting hammers or drivers for setting the pins in the pin carriage.

In the construction shown the pin carriage comprises a bottom plate 4 and an upper plate 5 attached together by bolts or screws 6 (Fig. 12). The upper side of the upper plate 5 is formed with a series of parallel ribs 7, forming channels or passages for guiding the type carrying parts during recording operations. Series of pins 8 are mounted in the carriage in holes formed in the upper and lower plates, the holes in the upper plate being in the channels between the ribs 7. Springs 9 encircle the pins 8 between shoulders 10 on said pins and the upper plate 5, said springs being effective to actuate and retain said pins in their lower position except when raised by operation of the keys. Projections 11 on said pins engage the upper side of the lower plate and support said pins in the carriage. There are nine pins in each row or series representing the digits from "0" to "8" inclusive, there being a permanent piece or abutment 12 for the "9" said piece 12 extending across the carriage in front of all the rows or series of pins. Along side of each row or series of pins is a latch bar or plate 13, said plate having projections 14 arranged to slide upon the lower plate 4. Each locking bar or plate 13 is actuated forwardly by a small spring 15 connecting same with rod 16 extending transversely in the carriage. Each locking bar or plate carries a series of pins or projections 17, there being one of said pins or projections for each of the pins 8 (Fig. 17). The pins 8 are provided with shoulders 18 which, in idle position of the pins, extend under the pins 17, so that when any one of said pins 8 is raised by operation of a digit key the shoulder 18 on said pin by rubbing against the projection 17 will move the locking bar or plate rearwardly until said shoulder 18 rises above the projection 17 at which time the spring 15 snaps the locking bar 13 to its idle position thereby placing the projection 17 under the shoulder 18 and latching the pin 8 in its elevated position. This operation is the same for all of the pins 8, so that when any one of said pins is raised by a key any other pin that may have been latched in elevated adjustment will be released and restored to idle or lowered position by its encircling spring 9, while the newly key-actuated pin will be latched in raised or operative position. The operation of a key therefore has the effect of raising and latching the pin 8 operated thereby and also releasing any other pin in that series that may have been in operative adjustment.

The pin carriage is supported upon rails 19 and 20 by a roller 21 connected to the carriage and operating upon the rail 19 and by rollers 20$^a$ operating on a rail 20. The carriage is retained by an extension of the lower plate 4 extending into a channel or groove in the rail 20, as shown at 22 in Fig. 17. In idle position the carriage is at the right of the machine relative to the operator, the first or left-hand row of pins being immediately above the key terminals or hammers 3 so that when a key is operated it will result in operation of one of the pins 8 in that series of pins located above the key terminals. Escapement mechanism controls the carriage and moves it step by step leftwardly as the keys are operated. The escapement mechanism illustrated comprises a supporting shaft 23 having arm 24 attached thereto, and connected with the carriage by a link 25, so that movement of said shaft 23 will also move the carriage. A toothed segment 26 is attached to the shaft 23. A rock shaft 27 extends transversely of the key levers and said shaft has two arms 28 attached thereto. A rod or bar 29 is supported by said arms 28 and rests against the upper edge of the key levers 2 so that operation of any one of said levers will rock the shaft 27. A spring 30, connecting one of said arms 28 with the base of the machine, holds the rock shaft in proper adjustment. An escapement member 31 is attached to the rock shaft 27 and is normally just above and out of engagement with the teeth on the segment 26. The other escapement member 32 is loosely supported upon the shaft 27 in engagement with the toothed segment 26 being sustained by a spring 33 connecting said loose member with the member 31 (Figs. 25 and 26). A spring 34 connecting an arm on the shaft 23 with the base or frame of the machine has a tendency to turn said shaft 23 and move the carriage leftwardly. When the digit keys are operated the shaft 27 is rocked and the escapement members 31 and 32 permit leftward step by step movement of the carriage. One side of the escapement member 32 is beveled or rounded as shown at 35 (Fig. 23) so that the escapement segment may pass thereover so as to return the carriage to its idle position at the right of the machine. The shaft 27 carries an arm 36 having a pin 37 extending in front of the forward ends of the locking bars or plates 13. As previously stated there are no pins in the carriage for the "9's" but nevertheless it is necessary for the carriage to move leftwardly whenever the "9" key is struck and it is also necessary that any pin in the series or row in which the "9" is represented shall be released from the locking bar or plate and returned to idle position. Operation of the "9" key therefore in addition to operating the escapement causes the pin 37 to impinge against the front end of the locking bar 13 which is in alinement therewith and to press said locking bar rearwardly a distance sufficient to release any of the pins 8 which may have been sustained thereby.

The foregoing operation of the pin carriage and the keys in controlling the same is substantially the same as the operation of the pin carriage in the Hopkins application and in the British patent above identified, and is also substantially the same as the operation of said parts in the "Dalton" machine on the market. The pin carriage is movable one step at a time and it is necessary to operate a key for each figure or digit in the number to be set up in the carriage. These machines also include mechanism for recording numbers and mechanism for adding numbers recorded. The recording mechanism comprises a series of type carriers 38 (Fig. 10) swinging over a shaft 39, and having type 40 upon their forward ends. One type carrier is provided for each row or series of pins in the carriage, and after any number has been set up in the carriage the type carriers are swung forwardly so as to place the type 40 in proper position and record the number on paper fed thereto by a paper carriage or platen 41. For each type carrier 31 a rack 42 is provided, said racks also swinging over the shaft 39, and having pin-and-slot action 43 with the type-carriers. After the carriage has been moved by the setting up of a number therein the proper racks and type carriers are swung forwardly so as to record and add that number. The racks are provided with heels 44 which move into the groove or channels on the pin carriage formed by the ribs 7 until said heels engage with the pins set up in said carriage with the "9" plate 12. This operation results in the proper type 40 being presented in alinement for recording the number and hammers or drivers 45 are operated automatically to drive said alined type effectively to record the number on the paper. The carriage supports a stop or retaining device 46, which, in idle position of the carriage, is in front of all of the heels 44 thereby preventing the operation of the recorder mechanism until the number has been set up in the carriage or until said retaining device is released. Each leftwardly step of the carriage releases one type carrier and rack so that as many type carriers and racks will be released as there are digits in the number to be recorded and added. This retaining device holds and prevents the operation of any of the type carriers and racks not required to operate, so that only the proper number thereto will be moved when the number is to be recorded and added. Automatic adding mechanism 47 adds or accumulates the numbers recorded, but since the operation of this adding or accumulating mechanism is the same as in the Hopkins application and British patent referred to and the same as in the "Dalton" machine on the market, it is unnecessary to describe this mechanism with greater particularity.

My present invention is adapted for use in connection with the mechanism described and includes a device under the control of the operator whereby the pin carriage may be moved one or more spaces or steps so as to set up therein one or more figures or digits at a single operation. In the drawings I have illustrated a device for setting up one or more of the "0" pins at a single operation, but it will be apparent that devices of a similar nature and purpose may be employed for setting up any other figures or digits in the carriage and I do not restrict myself to the use of such device for setting up any particular figures or digits or for moving any particular pins.

The small shaft 48 is journaled in bearings supported by the base or frames of the machine and extends transversely under the key-board plate (Figs. 4, 5 and 6). A lever 49 is pivoted upon said shaft 48, said lever having two arms, one of which extends forwardly and is pivotally connected to a key stem 50 which operates through a hole in the key-board plate and has a finger piece or key-button 51 on its upper end. The button 51 is arranged preferably in front of the usual numeral keys in position for convenient operation after any of the numeral keys 1 have been operated. In the present instance the key 51 has a key for causing the pin carriage to move three spaces at a single operation and said key pins or characters which will be set up or represented in the carriage as a result of operation of said key. An arm or lever 52 is rigid on the shaft 48 close to the lever 49 and has elastic or yielding connection with said lever 49 by a spring 53 so that when the key 51 is operated the shaft 48 will be rocked. The opposite end of the shaft 48 has an arm or lever 54 attached thereto and a link 55 is pivoted to said arm or lever. The link 55 extends toward the rear of the machine and is pivoted to a cam lever 56 supported on a shaft 57 parallel and rearwardly from the carriage rail 19. Other keys may also be connected to the shaft 48 and, in the present instance, I have shown one other such key. Said key is shown at 58 (Fig. 4) and the stem thereto is pivoted to a lever 59 loosely supported on the shaft 48. Said lever 58 has yielding or elastic connection with an arm or lever 60 loosely mounted on the shaft 48, a spring 61 constituting said connection. A link 62 has its forward end pivoted to the arm or lever 60 and its rear end pivoted to a cam lever 63, similar to the cam lever 56 and also supported by the shaft 57. The distance separating the two levers 56 and 63 in the present instance is equal to the distance between two adjacent rows or series of pins in the pin carriage.

The rear side of the pin carriage supports a small frame or housing 64 having holes in its upper and lower walls through which pins 65 extend. The idle position of said pins is that in which their upper ends are substantially flush with the upper side of the frame or housing supporting them. Said pins are actuated downwardly by encircling springs 66 which are mounted between the upper wall of the frame or housing and ribs or flanges 67 on said pins. Said pins are supported in the frame or housing by shoulders 68, the upper sides of which are beveled (Fig. 13). A latch plate 69 is slidably supported in said frame or housing and is provided with holes 70 through which the pins 65 project and operate. A spring 71 actuates said plate in one direction so that when any pin is raised the beveled or oblique shoulder 68 on said pin will move the latch plate 69 until said shoulder passes above said plate, at which time the spring 71 will snap the latch plate to its normal position and latch the pin 65 in its raised position.

It will be obvious from the foregoing description and from an examination of the structure as illustrated in Fig. 13, that if any one of the pins 65 is latched in the elevated adjustment and any other one of said pins be raised the first named pin will be released and returned to idle position by expansion of its encircling spring, while the pin last operated will be latched in the upper position. The pins 65 are spaced the same as the series or rows of pins in the pin carriage, and the same as the distance separating the levers 56 and 63. The pins 65 are carried above the upper ends of the cam levers 56 and 63 so that when either one of said levers is operated its upper end will engage the pin 65 immediately above and raise said pin to an elevated adjustment, which action will be understood by reference to the parts as illustrated in Fig. 17. A lever 72 is attached to a rock shaft 73, said lever having a depending arm and another arm projecting above the frame or housing 64. The spring 74 connects the horizontal arm of said lever with a support 75 and is effective to hold said lever and the rock shaft 73 in idle position in which the horizontal arm of said lever 72 is above the pins 65, so that any of said pins which may be elevated can pass thereunder. A pin 76 on the depending arm of the lever 72 extends close to the rear edges of the levers 56 and 63, so that when either of said levers is operated to raise a corresponding pin 65, said lever so operated will also operate the lever 72, rock the shaft 73 and move the horizontal arm of said lever 72 in a position to constitute an abutment for the pin 65 so raised. The distance which the carriage moves at this operation, whether two or more spaces, is determined by the key operated. It is necessary also that the escapement mechanism controlling the pin carriage be released so that said carriage may move the number of spaces desired. For this purpose the shaft 73 is connected with the escapement effectively to release the same when said shaft is rocked as just described. An arm 76ᵃ attached to said shaft 73 has a link 77 connecting said arm with a lever 78 on the rock shaft 27. Said lever 78 is connected to the escapement member 32 which is loose on said shaft 27. These connections result in releasing the escapement member 32 from engagement with the escapement segment 26 so that the shaft 23 is free to turn and move the pin carriage. The carriage being thus released will be moved by its spring 34 until the pin 65 raised by operation of the multiple digit or tabulating key comes in contact with the horizontal arm of the lever 72 by which movement of the carriage will be stopped. When the tabulating key so operated is released the escapement member 32 becomes again engaged with the segment 26 and any other digit keys may be operated to set up any other pins in the pin carriage. In the specific embodiment shown the lever 56 is operative to permit the carriage to move three steps or spaces and the lever 63 is operative to permit the carriage to move two steps or spaces, at a single operation. Additional keys and connections may be employed to move the carriage any desired distance whether two, or three or more, all of which will be readily understood from the arrangement herein shown and described.

In the embodiment shown the multiple zero or tabulating keys are locked against operation until after the carriage has been moved one or more spaces by operation of the numeral or digit keys. This locking device consists of a pin 79 (Fig. 13) mounted in the housing 64 and preventing the operation of the lever 73 until the carriage moves leftwardly. This device is effective to prevent idle and useless operation of the carriage by repeated operation of those keys which merely represent ciphers, which would be of no value except when preceded by one or more digits. After each number set up in the carriage has been added or recorded the carriage is automatically returned to its idle position at the right of the machine relative to the operator facing the machine (except in instances where the repeat device is used to repeat a number).

All of the pins 8 which represent the "0" in the pin carriage are raised automatically to operative position when the pin carriage returns to idle position. A hanger 80 is attached to the rail 19 and pivotally supports a bracket 81, said bracket 81 having a pin 82 projecting into a slot 83 in the hanger 80 thereby limiting the movement of the bracket. A roller 84 is supported by the upper end of the bracket 81 in the path of movement of the "0" pins in the pin carriage, so that when the pin carriage returns to idle position the lower ends of the "0" pins therein will contact with said roller and be forced upwardly thereby. A plate 85 is also pivotally connected to the bracket 81 and is supported by an arm 86 on the hanger 80, said plate being effective to uphold the pins raised by the roller 84. Therefore when either of the keys 51 or 58 is operated the carriage will be moved a sufficient distance to carry the required number of "0" pins to the proper orders in operative position, without the necessity of operating the usual "0" key contained in the keyboard. The key levers 2 operate in notches in the plate 87 to which are pivoted locking plates 88, so that when one key is depressed the locking plates on each side thereof will be moved and held in position to prevent operation of any other key until the depressed key returns to idle position. These locking plates prevent the operation of more than one numeral key at a time so as to require each key lever to return to idle position, and to enable the carriage to move, before another key can be operated. The keys 51 and 58 are also provided with locking devices so that when either of said keys or any one of the numeral keys is operated the keys which are idle will be locked against operation. The locking devices for the keys 51 and 58 are duplicates, comprising arms 89 pivoted to the levers 49 and 60 respectively. Said arms 89 rest in notches in the plate 87 in which the numeral keys operate, extending between oblique portions of adjacent locking plates 88. Each arm 89 is provided with a shoulder 90, so that when said arm is drawn forwardly by operation of its key said arm will be raised effectively to swing laterally thus locking the plates 88 at each side thereto so as to lock the numeral keys and the other tabulating keys from operation. A projection 91 on each arm 89 constitutes an abutment for the numeral key in the same notch therewith so as to prevent the operation of said numeral key. The numeral key lever above each arm 89 has a notch 92 arranged to receive the projection 91 when said numeral key is depressed which will lock the tabulating key to which said arm is connected. The arms 89 are held in their proper position by a small spring 93, connecting said arms with the base of the machine.

From the foregoing it will be seen that I have provided mechanism whereby the pin carriage of the adding machine of the type herein referred to may be moved any desired number of spaces at a single operation, and have provided appliances whereby said keys when representing ciphers will be locked against operation before the pin carriage has been moved as by repeating therein some digit or digits of value for the higher orders. I am aware that this mechanism may be arranged otherwise than as illustrated, and that keys for other digits may be employed. I do not restrict myself to the specific form or arrangement shown or to the specific use and operation described since it is apparent that there may be various modifications without departure from the nature and principle of my invention.

What I claim and desire to secure by Letters Patent of the United States is—

1. In an adding machine, a key-board comprising a plurality of super-imposed rows of keys, a carriage controlled by said keys, means holding said carriage, pins in said carriage, automatic means for moving a number of said pins to operative position when said carriage is moved in one direction, key devices operable to release said carriage while said pins remain in operative position therein, and tabulating stops determining the distance of the movement of said carriage when it is released as aforesaid, substantially as described.

2. In an adding machine a carriage, keys operable to set up numbers in said carriage, means to prevent operation of more than one of said keys at a time, tabulating mechanism whereby said carriage may be permitted to move a predetermined distance, and a device controlled by said tabulating mechanism to prevent operation of said keys at the time said tabulating mechanism is in operation, substantially as specified.

3. In an adding machine, the combination with the movable pin carriage, keys for setting up numbers in said carriage, tabulating mechanism for causing said carriage to move a predetermined distance, and means controlled by said keys to prevent operation of said tabulating mechanism during the operation of said keys, substantially as described.

4. In an adding machine, a carriage, means holding said carriage, series of pins in said carriage, keys for raising said pins, a latch device effective to hold said pins when raised by said keys, automatic means for raising a number of said pins when said carriage moves in one direction, tabulating stops carried by said carriage, and tabulating mechanism operable to set said tabulating stops and release said carriage, substantially as described.

5. In an adding machine, a movable carriage, movable pins in said carriage, escapement mechanism controlling said carriage, keys operable to set said pins and cause said escapement mechanism to operate effectively to move said carriage, latch devices in said carriage holding said pins when they are moved by said keys, and a key operable to release all of said pins and to cause said escapement to operate, substantially as described.

6. In an adding machine, a movable carriage, mechanism for setting up numbers in said carriage and permitting said carriage to move, stops supported by said carriage, levers operable to set said stops, an abutment for said stops controlled by said levers, tabulating keys, and connections from said tabulating keys and said levers, substantially as described.

7. In an adding machine, the combination with a movable carriage, a device for setting up numbers in said carriage, a series of tabulating stops carried by said carriage, levers operable to move said tabulating stops, keys, links having the rear ends connected to said levers, and elastic or yielding connections between said keys and said links, substantially as specified.

8. In an adding machine, a movable pin carriage, ribs on the upper side of said carriage forming channels, pins mounted in said carriage, means for moving said pins so that their ends will extend into said channels, type-carriers, and racks having projections arranged to move into said channels and engage said pins when said type-carriers are operated, substantially as described.

9. In an adding machine, a movable carriage, channels formed on the upper side of said carriage, pins mounted in said carriage, spring actuating said pins downwardly, keys for moving said pins to project into said channels, type-carriers operable to record numbers represented by said pins, and connections from said type-carriers operating in said channels and having their movement limited by the pins which project into said channels, substantially as specified.

10. In an adding machine, a shaft, levers mounted on said shaft, keys pivoted to said levers, links connected to said levers, cam levers connected to said links, a movable carriage, pins in said carriage, keys for adjusting said pins to represent numbers, and mechanism controlled by said cam levers whereby said carriage may be moved a predetermined distance after any one of said last named keys has been operated, substantially as specified.

11. In an adding machine, a movable carriage, pins in said carriage, keys for adjusting said pins to represent numbers, tabulating stop pins carried by said carriage, an abutment for said stop pins, and keys for setting said stop pins and causing said carriage to move until stopped by engagement of said stop pins with said abutment, substantially as described.

12. In an adding machine, a movable carriage, pins in said carriage, a shaft, an arm on said shaft, a link connecting arm with said carriage, an escapement rack on said shaft, escapement pawls engaging with said rack, keys operable to adjust said pins in said carriage to represent numbers and to operate said escapement, a spring for moving said escapement and said carriage when said keys are operated, a recording mechanism operable to record the numbers represented by said pins, substantially as described.

13. In an adding machine, a movable carriage, pins in said carriage, keys operable to set said pins to represent numbers, means for moving said carriage step by step when said keys are operated, tabulating stops on said carriage, keys whereby said stops may be moved and said carriage caused to move, and an abutment actuated by said last named keys effectively to engage the tabulating stops and limit movement of the carriage, substantially as specified.

14. In an adding machine, the combination with a movable pin carriage, an escapement for moving said carriage, and a series of numeral keys for controlling said escapement to move said carriage, of tabulating mechanism arranged to coöperate with said escapement to move said carriage only after one or more of said numeral keys have been operated, substantially as described.

15. In an adding machine, the combination with a movable carriage, an escapement device for moving said carriage, and numeral keys for controlling said escapement to move said carriage, of devices independent of said numeral keys for causing said escapement to move said carriage, and means for rendering said devices ineffective to cause said escapement to move said carriage before certain of said numeral keys have been operated.

16. In an adding machine, the combination, with a movable pin carriage, and numeral keys whose operation is necessary before said carriage may be operated, of tabulating mechanism operable to cause said carriage to move only after one or more of said numeral keys have been operated, substantially as specified.

17. In an adding machine, the combination with a movable carriage and numeral keys for setting up numbers in said carriage and whose operation is necessary before said carriage may be moved, of tabulating mechanism operable to cause said carriage to move only after one or more of said numeral keys have been operated, substantially as specified.

18. In an adding machine, a movable carriage, rows of pins in said carriage, keys for operatively setting said pins to represent numbers, means for moving said carriage, means for setting certain of said pins as an incident to moving said carriage to its idle position, and tabulating mechanism operable to cause said carriage to move only after operation of one or more parts of said selective setting means, substantially as specified.

19. In an adding machine, the combination with a movable carriage, pins in said carriage, and devices for setting said pins to limit movement of said carriage, of an abutment settable by said devices to engage with any pins set by said devices to stop said carriage, and means for holding said abutment out of the path of movement of said pins and also holding said devices disengaged from said pins, substantially as described.

20. In an adding machine, the combination of a series of depressible keys, elements controlled by said keys to prevent depression of more than one key at a time, a lever, an arm on said lever for holding said elements to prevent depression of any of said keys, means for actuating said lever to move said arm in one direction to position to prevent movement of said elements and thereby prevent depression of any of said keys, means for actuating said lever in the opposite direction, and a spring for moving said arm to position to enable said elements to move on depression on any one of said keys, substantially as described.

21. In an adding machine, the combination with a series of depressible numeral keys, a plate provided with notches in which said keys operate, and plates pivoted on said first-named plate adjacent to said keys, of an arm for actuating said second named plates to prevent depression of any of said numeral keys, means normally holding said arm in position to enable said numeral keys to be depressed, means for actuating said arm and thereby said plates to prevent depression of any of said numeral keys, and means on said arm arranged to engage with one of said numeral keys, substantially as described.

22. In an adding machine, the combination with a series of numeral keys, and a series of elements for preventing operation of said keys, of a device for actuating said elements to prevent operation of said numeral keys, and means whereby one of said numeral keys will engage with and prevent operation of said device when said numeral key is depressed, substantially as described.

23. In an adding machine, the combination with a movable carriage, of a series of stops on said carriage for limiting movement of said carriage, an abutment movable into and out of the path of movement of said stops to limit movement of said carriage, and a device for setting said stops and moving said abutment into the path of said stops, of means in connection with said abutment normally holding said device out of engagement with said stops, substantially as described.

In witness whereof I have signed this specification in the presence of two subscribing witnesses.

HARRY LANDSIEDEL.

Witnesses:
S. C. BUNN,
J. D. RIPPEY.